Jan. 31, 1928.
J. KINDERVATER
1,657,756
FLEXIBLE STAY BOLT AND MEANS FOR MOUNTING THE SAME
Filed June 10, 1926
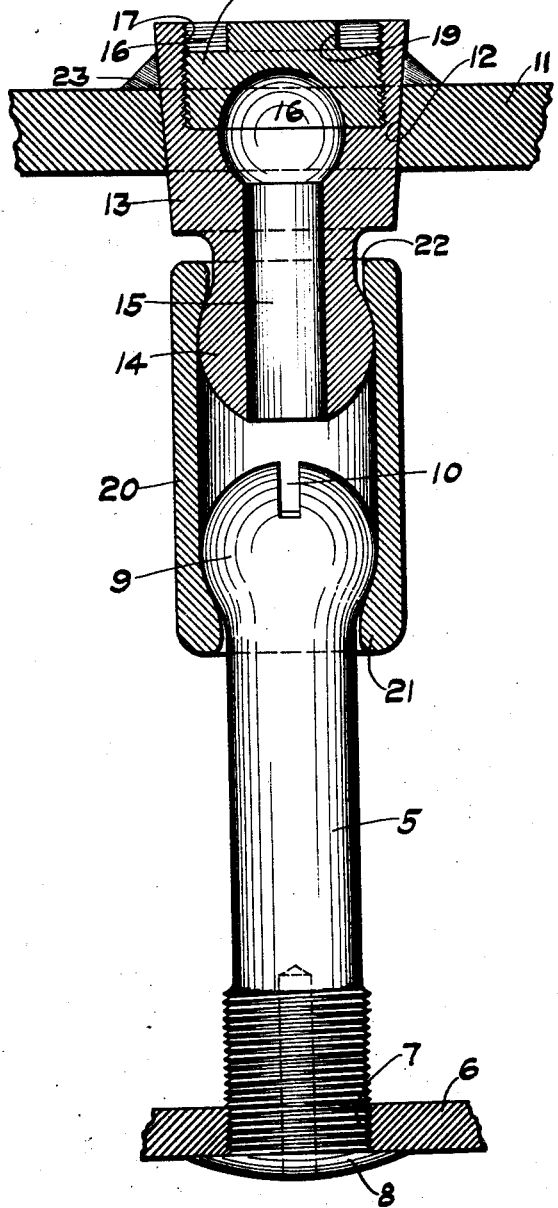
INVENTOR
Julius Kindervater
BY
Clarence L. Kerr
ATTORNEY Patented Jan. 31, 1928.

1,657,756

UNITED STATES PATENT OFFICE.

JULIUS KINDERVATER, OF RICHMOND, VIRGINIA.

FLEXIBLE STAY BOLT AND MEANS FOR MOUNTING THE SAME.

Application filed June 10, 1926. Serial No. 115,031.

My invention relates to boiler staybolts of the flexible type and has for its object the provision of a staybolt structure of this general type in which access can be had to the outer end of the bolt to facilitate the seating of the bolt in the fire box wall. With this and other objects in view the invention comprises a bolt adapted to be attached at its inner end to the fire box sheet and terminating at its outer end in a ball member, an anchor member adapted to be seated in the boiler shell and terminating at its inner end in a ball member, and a sleeve member providing socket seats for the ball members. A feature of the invention resides in the provision of a channel or opening in the anchor member through which a tool can be inserted to engage the outer end of the bolt. A cap or plug member may be employed to close the outer end of the perforated anchor member.

In the accompanying drawing, the single view is a vertical section showing my improved staybolt structure, applied to the shell and the fire box sheet of a boiler.

The improvement claimed is hereinafter fully set forth:

In the practice of my invention, referring descriptively to the specific embodiment thereof which is herein exemplified, a bolt member, 5 is attached at its inner end to the fire box sheet or wall 6 through a double attachment including a threaded connection at 7 and an upset or riveted formation 8. The upper end of the staybolt member 5 terminates in a ball-shaped portion 9 provided with a slot 10 at the extreme terminal portion thereof.

The boiler shell 11 is provided with a tapered opening 12 in which is mounted an anchor member or plug 13 having a tapered formation to fit the tapered edges of the opening 12 in the wall 11.

The anchor member 13 extends inwardly into the interior space of the boiler and terminates in a ball-shaped member 14 which, when the parts are in position, is locked relatively closely adjacent to the ball-shaped end 9 of the bolt 5. The anchor member 13 is provided with an opening or channel 15 extending axially therethrough and terminating in the upper portion of the member 13 in an opening 16 of increased diameter which is internally threaded as at 17. A plug member 18 is adapted to have threaded engagement with the inner threaded surface of the member 13 to provide a closure therefor. The plug member may be inserted or removed, as desired, by the application of a wrench or other tool to a wrench seat 19 formed thereon.

A sleeve member 20 is adapted to receive in opposite ends of its bore the ball-shaped terminal members 9 and 14, of the bolt 5 and anchor member 13, respectively. The lower end of the sleeve member 20 is pressed inwardly at 21 and the upper end at 22 to lock the ball members 9 and 14 into place within the sleeve and to provide sockets or seats for the ball-shaped members so that the sleeve structure provides as a whole a universal joint including two ball and socket joint structures.

The channel or opening 15 extending through the anchor member 13 provides, when the plug member 18 is removed, means for gaining access to the outer end of the bolt 5. In assembling the structure, a tool may be inserted through the opening 15 in the anchor member 13 to engage the slot 10 in the outer end of the bolt 5 to thereby rotate the bolt about its longitudinal axis and cause it to enter into threaded engagement with the opening in the fire box wall 6 provided for the purpose. When the bolt has been placed in the desired threaded relation to the fire box wall 6, an anvil member may be inserted through the opening 15 in the anchor member 13 to engage the outer end of the bolt 5 and hold the bolt member 5 during the riveting or upsetting operation which is then applied to the extreme inner end 8 of the bolt 5 within the fire box chamber.

The anchor member 13 may be attached to the boiler wall 11 in any suitable manner as by welding indicated at 23.

It will be seen that I have provided a staybolt structure in which a relatively high degree of flexibility is obtained and that, through the passageway 15 formed in the anchor member 13, I have provided convenient means for obtaining access to the outer end of the bolt in order to assemble the structure and attach the bolt 5 to its position in the fire box wall 6.

I claim as my invention and desire to secure by Letters Patent:

1. In a staybolt structure, a bolt attached at its inner end to the fire box wall and having a ball-shaped formation at its outer end, the boiler shell being provided with an opening opposite the outer end of the bolt, an anchor member seated in the opening in the boiler shell and terminating in a ball-shaped formation adjacent the ball-shaped end of the bolt, and a hollow sleeve member enclosing the ball-shaped terminal portions of the bolt and the anchor member to provide a double ball and socket joint, said anchor member being provided with an opening extending therethrough to provide access to the outer end of the bolt.

2. In a flexible staybolt structure, a bolt attached at its inner end to the fire box wall and having a ball-shaped outer end, the boiler shell being provided with an opening opposite the outer end of the bolt, a tapered anchor member seated in said opening and having a downward extension terminating in a ball-shaped end, a hollow sleeve member having socket formations at its opposite ends in which to receive the ball-shaped ends of the anchor member and the bolt, said anchor member being provided with an opening therethrough to provide access to the outer end of the bolt, and a plug member for closing the opening through the anchor member.

3. In a flexible staybolt structure, a bolt having threaded engagement at its inner end with the fire box wall and having a ball-shaped outer end, the boiler shell being provided with an opening opposite the outer end of the bolt, a tapered anchor member seated in said opening and having a downward extension terminating in a ball-shaped end, a hollow sleeve member having socket formations at its opposite ends in which the receive the ball-shaped ends of the anchor member and the bolt, said bolt being provided with a transverse slot in its outer end, and said anchor member being provided with an opening through which a tool may be extended to engage the slot and rotate the bolt to bring about threaded engagement thereof with the fire box wall.

4. In a flexible staybolt structure, a bolt having threaded engagement at its inner end with the fire box wall and having a ball-shaped outer end, the boiler shell being provided with an opening opposite the outer end of the bolt, a tapered anchor member seated in said opening and having a downward extension terminating in a ball-shaped end, a hollow sleeve member having its opposite extremities inturned to provide sockets in which to receive the ball-shaped ends of the anchor member and the bolt, said bolt being provided with a transverse slot in its outer end, said anchor member being provided with an opening through which a tool may be extended to engage the slot and turn the bolt and through which an anvil bar may be inserted to support the bolt in a riveting operation applied to its inner end, and a removable cap member for closing the outer end of the opening through the anchor member.

JULIUS KINDERVATER.